(12) United States Patent
Gallagher (10) Patent No.: US 8,000,505 B2
(45) Date of Patent: Aug. 16, 2011

(54) DETERMINING THE AGE OF A HUMAN SUBJECT IN A DIGITAL IMAGE

(75) Inventor: Andrew C. Gallagher, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 1097 days.

(21) Appl. No.: 10/932,353

(22) Filed: Sep. 1, 2004

(65) Prior Publication Data

US 2006/0045352 A1   Mar. 2, 2006

(51) Int. Cl.
*G06K 9/00* (2006.01)
*A61B 3/00* (2006.01)
*A61B 3/10* (2006.01)

(52) U.S. Cl. ......... 382/117; 382/118; 351/200; 351/204
(58) Field of Classification Search .................. 382/118; 351/204
See application file for complete search history.

(56) References Cited

U.S. PATENT DOCUMENTS

| | | | | |
|---|---|---|---|---|
| 5,781,650 | A * | 7/1998 | Lobo et al. | 382/118 |
| 5,818,457 | A * | 10/1998 | Murata et al. | 345/629 |
| 6,292,574 | B1 * | 9/2001 | Schildkraut et al. | 382/117 |
| 7,304,677 | B2 * | 12/2007 | Keelan et al. | 348/333.01 |
| 7,319,779 | B1 * | 1/2008 | Mummareddy et al. | 382/118 |
| 2002/0076100 | A1 * | 6/2002 | Luo | 382/164 |
| 2003/0068084 | A1 * | 4/2003 | Kinjo et al. | 382/164 |
| 2003/0095197 | A1 * | 5/2003 | Wheeler et al. | 348/241 |
| 2004/0046878 | A1 * | 3/2004 | Jarman | 348/239 |
| 2004/0111124 | A1 * | 6/2004 | Walker et al. | 607/7 |
| 2005/0111737 | A1 * | 5/2005 | Das et al. | 382/190 |
| 2005/0196067 | A1 * | 9/2005 | Gallagher et al. | 382/275 |
| 2005/0232481 | A1 * | 10/2005 | Wu | 382/167 |
| 2006/0008169 | A1 * | 1/2006 | Deer et al. | 382/254 |
| 2006/0018507 | A1 * | 1/2006 | Rodriguez et al. | 382/100 |
| 2006/0126901 | A1 * | 6/2006 | Mattes et al. | 382/104 |

FOREIGN PATENT DOCUMENTS

WO  WO 99/17254  4/1999

OTHER PUBLICATIONS

Lobo et al. "Age classification from facial images" Computer Vision and Image Understanding vol. 74, No. 1 Apr. 1999, pp. 1-21.*
Hayashi et al. "Age and Gender Estimation from Facial Image Processing" SICE 2002 Aug. 5-7, 2002, pp. 13-18.*
Horng et al. "Classification of Age Groups Based on Facial Features" Tamkang Journal of Science and Engineering, vol. 4, No. 3, pp. 183-192 (2001).*
Marc Green, "Visual Forensics of Older Drivers", Nov. 18, 2004, http://www.visualexpert.com/Resources/olderdrivers.html, pp. 1-5.
Kwang Nam Choi, Marco Carcassoni and Edwin R. Hancock, "Estimating 3D Facial Pose using the EM Algorithm", British Machine Vision Conference, pp. 84-93, 1998.

* cited by examiner

*Primary Examiner* — Anand Bhatnagar
*Assistant Examiner* — Randolph Chu
(74) *Attorney, Agent, or Firm* — Robert Luke Walker; Kevin E. Spaulding (57) ABSTRACT

The age class of a human subject is ascertained in a digital image. The subject has a redeye defect pair; each defect having one or more defect pixels. In the method, two regions of pixels corresponding to the defects are identified. The distance between the regions is measured. A region size is determined, based upon the size of at least one of the regions. An age class is determined from the distance and region size.

39 Claims, 4 Drawing Sheets

DETERMINING THE AGE OF A HUMAN SUBJECT IN A DIGITAL IMAGE

FIELD OF THE INVENTION

The invention relates to digital image processing and analysis and more particularly relates to determining the age of a human subject having redeye in a digital image.

BACKGROUND OF THE INVENTION

A significant and important problem in digital image processing is automatic detection of people in digital images. A further problem is the determination and classification of the age of people in digital images. Reliable automatic age classification of human faces in a digital image would enable many applications.

U.S. Pat. No. 5,781,650, to Lobo et al. describes a method of classifying the age of a face in a digital image using ratios of certain distances derived from the face and using snakelets to perform a wrinkle analysis. This approach has some shortcomings. It can be difficult to locate facial features in an image with a high degree of confidence. Wrinkles appear at vastly different ages for different people. The presence of wrinkles is highly dependent on facial expression. Adding more ambiguity to the problem is that many aging people who begin to develop wrinkles opt for plastic surgery and other medical procedures to remove wrinkles.

Redeye detection is well known. Examples of techniques for this purpose are disclosed in U.S. Pat. No. 6,292,574 to Schildkraut et al. and PCT Patent publication WO 9917254.

Generally, when an eye exhibits the redeye defect in an image, the pupil is at least partially dilated. The maximum pupil dilation is a function of age. With aging, there is deterioration in vision in low light conditions. There are neural losses, but the major decline is due to changes in the eye's optics. The lens and other optical media become more opaque and the lens becomes yellower, allowing less light entering the eye to reach the photoreceptors and making discrimination of blue colors more difficult. The relative size of the pupil shrinks, allowing less light to enter the eye. The pupil's response to dim light decreases with age and becomes virtually nil by age 80. Table 1 shows how the pupil size shrinks with age.

TABLE 1

Pupil Size as a function of Age

| Age (yr) | Day - pupil size (in mm) | Night - pupil size (in mm) |
| --- | --- | --- |
| 20 | 4.7 | 8.0 |
| 30 | 4.3 | 7.0 |
| 40 | 3.9 | 6.0 |
| 50 | 3.5 | 5.0 |
| 60 | 3.1 | 4.1 |
| 70 | 2.7 | 3.2 |
| 80 | 2.3 | 2.5 |

(Downloaded on the date of Aug. 31, 2004, from the Internet address: http://www.visualexpert.com/Resources/olderdrivers.html.)

A method by which the head pose (out-of-plane rotation relative to a subject plane of a digital image) can be derived through automatic analysis is disclosed in "Estimating Facial Pose Using the EM Algorithm", K. Choi et al., Ninth British Machine Vision Conference, 1998, downloaded on the date of Aug. 31, 2004, from the Internet at: http://www.bmva.ac.uk/bmvc/1998/pdf/p147.pdf.

It would thus be desirable to provide improvements in classifying the age of a human by analyzing an image of the human's face.

SUMMARY OF THE INVENTION

The invention is defined by the claims. The invention, in broader aspects, provides a method, in which an age class of a human subject is ascertained in a digital image. The subject has a redeye defect pair. Each defect has one or more defect pixels. In the method, two regions of pixels corresponding to the defects are identified. The distance between the regions is measured. A region size is determined, based upon the size of at least one of the regions. An age class is determined from the distance and region size.

It is an advantageous effect of the invention that improved ways of classifying the age of a human by analyzing an image of the human's face are provided, which utilize red eye detection.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

In the methods herein, the age of a human subject in a digital image is ascertained using redeye defects. Two regions of pixels corresponding to the defects are identified and a distance between the two is measured and a region size is determined based on at least one of the defects A range of ages (also referred to herein as an "age class") is determined from the distance and region size.

In the following description, some embodiments of the present invention will be described as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

The computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 2:
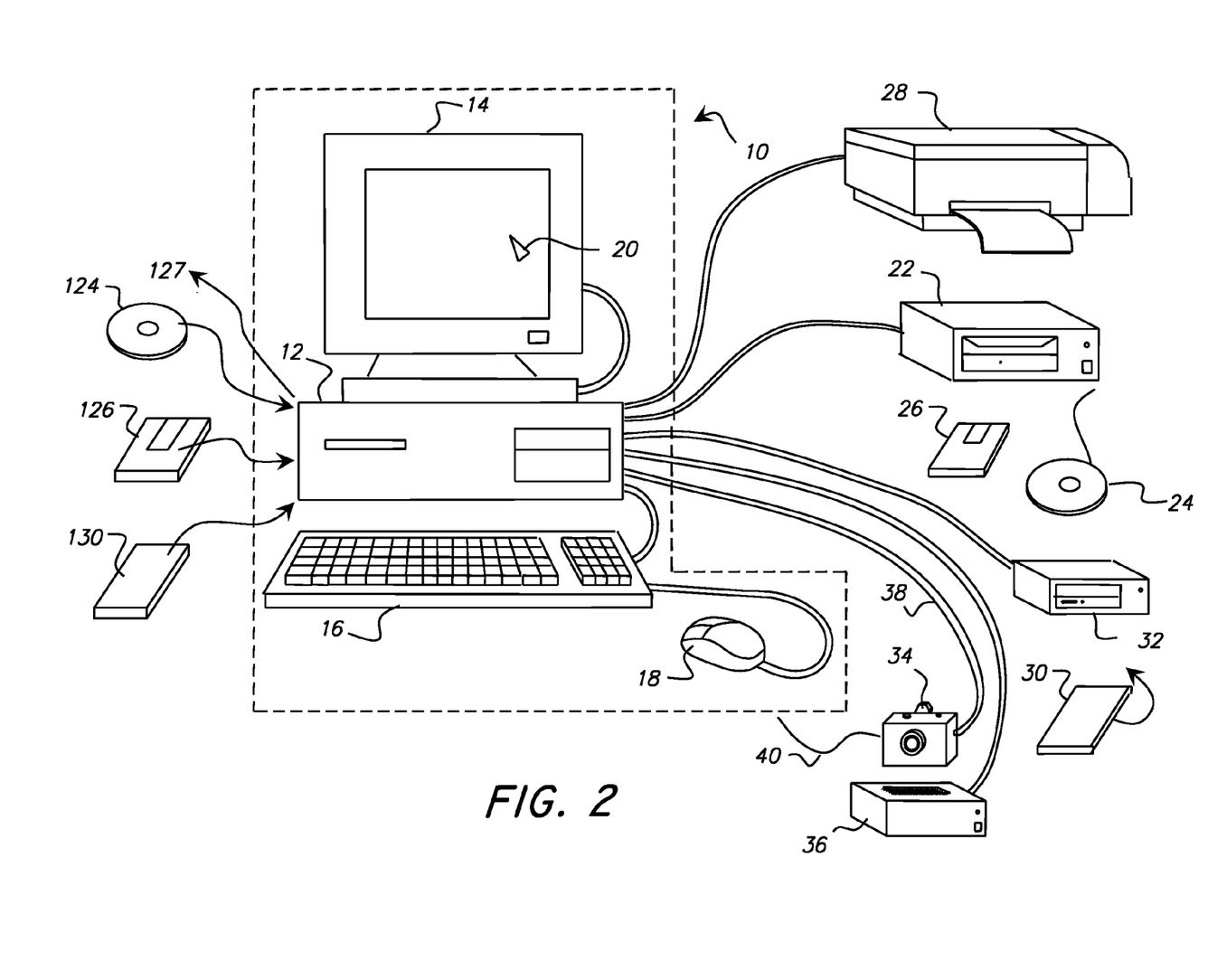
FIG. 2 is a diagrammatical view of a system incorporating the digital signal processor of FIG. 1.

The present invention can be implemented in computer hardware. Referring to FIG. 2, there is illustrated a computer system 10 for implementing the present invention. Although the computer system 10 is shown for the purpose of illustrating a preferred embodiment, the present invention is not limited to the computer system 10 shown, but may be used on any electronic processing system such as found in home computers, kiosks, retail or wholesale photofinishing, or any other system for the processing of digital images. The computer system 10 includes a microprocessor-based unit 12 for receiving and processing software programs and for performing other processing functions. A display 14 is electrically connected to the microprocessor-based unit 12 for displaying user-related information associated with the software, e.g., by means of a graphical user interface. A keyboard 16 is also connected to the microprocessor based unit 12 for permitting a user to input information to the software. As an alternative to using the keyboard 16 for input, a mouse 18 may be used for moving a selector 20 on the display 14 and for selecting an item on which the selector 20 overlays, as is well known in the art.

A compact disk-read only memory (CD-ROM) 24, which typically includes software programs, is inserted into the microprocessor based unit for providing a means of inputting the software programs and other information to the microprocessor based unit 12. In addition, a floppy disk 26 may also include a software program, and is inserted into the microprocessor-based unit 12 for inputting the software program. The compact disk-read only memory (CD-ROM) 24 or the floppy disk 26 may alternatively be inserted into externally located disk drive unit 22, which is connected to the microprocessor-based unit 12. Still further, the microprocessor-based unit 12 may be programmed, as is well known in the art, for storing the software program internally. The microprocessor-based unit 12 may also have a network connection 27, such as a telephone line, to an external network, such as a local area network or the Internet. A printer 28 may also be connected to the microprocessor-based unit 12 for printing a hardcopy of the output from the computer system 10.

Images may also be displayed on the display 14 via a personal computer card (PC card) 30, such as, as it was formerly known, a PCMCIA card (based on the specifications of the Personal Computer Memory Card International Association), which contains digitized images electronically embodied in the card 30. The PC card 30 is ultimately inserted into the microprocessor-based unit 12 for permitting visual display of the image on the display 14. Alternatively, the PC card 30 can be inserted into an externally located PC card reader 32 connected to the microprocessor-based unit 12. Images may also be input via the compact disk 24, the floppy disk 26, or the network connection 27. Any images stored in the PC card 30, the floppy disk 26 or the compact disk 24, or input through the network connection 27, may have been obtained from a variety of sources, such as a digital camera (not shown) or a scanner (not shown). Images may also be input directly from a digital camera 34 via a camera docking port 36 connected to the microprocessor-based unit 12 or directly from the digital camera 34 via a cable connection 38 to the microprocessor-based unit 12 or via a wireless connection 40 to the microprocessor-based unit 12.

The output device can be a printer or other output device that provides a paper or other hard copy final image. The output device can also be an output device that provides the final image as a digital file. The output device can also include combinations of output, such as a printed image and a digital file on a memory unit, such as a CD or DVD.

The present invention can be used with multiple capture devices that produce digital images. For example, FIG. 2 can represent a digital photofinishing system where the image-capture device is a conventional photographic film camera for capturing a scene on color negative or reversal film, and a film scanner device for scanning the developed image on the film and producing a digital image. The capture device can also be an electronic capture unit (not shown) having an electronic imager, such as a charge-coupled device or CMOS imager. The electronic capture unit can have an analog-to-digital converter/amplifier that receives the signal from the electronic imager, amplifies and converts the signal to digital form, and transmits the image signal to the microprocessor-based unit 12.

The present invention can be used with a variety of output devices that can include, but are not limited to, a digital photographic printer and soft copy display. The microprocessor-based unit 12 can be used to process digital images to make adjustments for overall brightness, tone scale, image structure, etc. of digital images in a manner such that a pleasing looking image is produced by an image output device.

The general control computer shown in FIG. 2 can store the present invention as a computer program product having a program stored in a computer readable storage medium, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device. Before describing the present invention, it facilitates understanding to note that the present invention is preferably utilized on any well-known computer system, such as a personal computer.

It should also be noted that the present invention can be implemented in a combination of software and/or hardware and is not limited to devices, which are physically connected and/or located within the same physical location. One or more of the devices illustrated in FIG. 2 may be located remotely and can be connected via a network. One or more of the devices can be connected wirelessly, such as by a radio-frequency link, either directly or via a network.

The present invention may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., PDA or cell phone that can be used as a processing unit, a display unit, or a unit to give processing instructions), and as a service offered via the World Wide Web.

In each case, the invention may stand alone or may be a component of a larger system solution. Furthermore, human interfaces, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm (s) may interface with a variety of workflow user interface schemes.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art.

Figure 1:
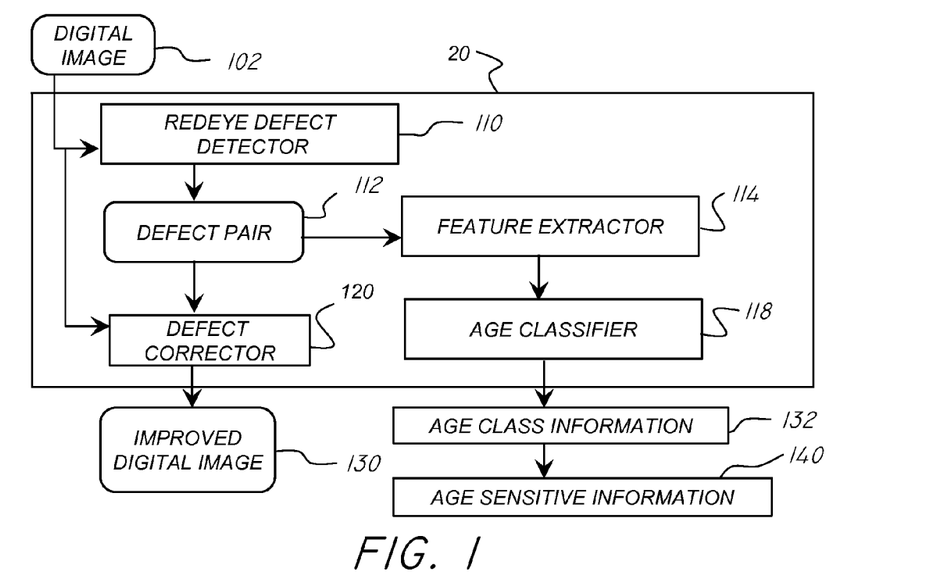
FIG. 1 is a block diagram of the digital image processor.

Referring now to FIG. 1, the digital image 102 is input to the microprocessor-based unit 12 for redeye detection and age classification. The digital image 102 is input to the redeye defect corrector 110 for detection of redeye defect. The output of the redeye defect detector 110 is a defect pair 112, that is, a pair of human left and right eye defects, in the digital image 102. Each defect of the defect pair 112 includes at least one pixel effected by the redeye defect. One defect of the redeye defect pair corresponds to the left eye of a human affected by the redeye defect, and the other defect corresponds to the right eye.

For a given image, the redeye defect detector may be used to detect 0, 1, or multiple defect pairs 112. The redeye defect detector 110 can internally scale the size of the digital image 102 by interpolation to normalize the analysis image size or to normalize the size of faces or skin regions in the image.

The output of the redeye defect detector 110 can take a variety of forms. A defect of the defect pair 112 can be in the form of an image map where pixels determined by the redeye defect detector 110 to be affected by redeye defect are assigned a different value than other pixels. A defect of the defect pair 112 can also be a list of pixels ((x,y) coordinate locations and possibly pixel color values) affected by the redeye defect.

The redeye defect detector 110 can be any method known in the art. The preferred redeye defect detector is described in U.S. Pat. No. 6,292,574 B1, to Schildkraut et al. Briefly summarized, first, the image is searched for skin colored regions. Next, an ellipse is fit to each skin region. Next, a resize factor is calculated and applied to each skin region. The goal is to resize a face skin colored region so that the eyes are separated by 75 pixels and fixed sized templates can be applied, when searching for redeye defects. Each skin region is searched for pairs of small red candidate defects. Various scores are analyzed (e.g. symmetry, score with respect to matching an eye template, etc.) and a final classification is performed indicating the position of likely redeye pairs in the image.

As an optional feature, the defect pair 112 is input to a defect corrector 120 along with the digital image 102 for correction of the defect pixels to produce an output image that is an improved digital image 130 having naturally-appearing pupils rather than pupils that appear to be affected by redeye. The correction is accomplished by modifying the color of pixels belonging to a defect of the defect pair 112 by any method known in the art for correcting redeye defect. For example, in WO 9917254 the color of a redeye-affected pixel is replaced with a value based on a weighted function of the minimum of the R, G, and B color components.

The defect pair 112 is input to the feature extractor 114 for producing one or more features 116 useful for determining the approximate age or age classification of the human subject associated with the defect pair 112. The feature extractor 114 calculates the geometric distance $R_D$ between the two redeye defects of the defect pair 112.

The distance $R_D$ between defects can be measured various ways. Measuring from centroid to centroid is preferred, since this approach is relatively tolerant of differences in apparent sizes of eyes due to partial closure and the like. In this approach, the geometric distance $R_D$ between the two defects of the pair is calculated as follows. For each of the two defects ($D_1$ and $D_2$) of the defect pair, the centroid location is calculated. The centroid of the first defect $D_1$ is $(x_1, y_1)$ and the centroid of the second defect $D_2$ is $(x_2, y_2)$. The calculation of the centroid $(x_C, y_C)$ of the $C^{th}$ defect $(D_C)$ is accomplished using the equation:

$$(x_C, y_C) = \left[\frac{\sum_{i=0}^{Q-1} x_i}{Q}, \frac{\sum_{i=0}^{Q-1} y_i}{Q}\right]$$

where:
  Q is the number of pixels belonging to the defect; and
  $(x_i, y_i)$ is the coordinate position of the $i^{th}$ pixel belonging to the defect.

Then, the distance $R_D$ between the two defects of the defect pair is calculated as the distance between the centroid locations of the two defects using the well-known distance formula:

$$R_D = \sqrt{(x_1-x_2)^2 + (y_1-y_2)^2}$$

$R_D$ is preferably in units of pixels.

Alternatively, the geometric distance $R_D$ between the two defects of the defect pair can be calculated with any number of variations based upon differently determined corresponding points on each of the members of the defect pair or points on the members determined by different types of separations. For example, the distance $R_D$ can be from rightmost pixel of the first defect to rightmost pixel of the second defect or can be the minimum value of all distances calculated between one pixel of the first defect and one pixel from the second defect.

Next, the region size $S_C$ is determined. The region size is a function of the size of one or both of the defects of a defect pair. The region size can be an average of the sizes $S_1$ and $S_2$ of the two defects or can be the size $S_1$ or $S_2$ of one of the two defects. For example, the region size can be preset at the maximum or minimum of $S_1$ and $S_2$. The measurement based on one defect can be used in all cases or can be used as a backup procedure to be followed one of the eyes appears to be inaccurately presented.

In the preferred embodiment, the size $S_C$ of a defect is the radius (units of pixels) of the smallest circle that inscribes the defect, that is, the smallest circle that when centered on the defect's centroid, contains all of the pixels associated with the defect within or on its boundary. Accordingly, the size of a defect $D_C$ is computed as:

$$S_C = \max_i \left[ \sqrt{(x_i - x_C)^2 + (y_i - y_C)^2} \right]$$

where:
$S_C$ is the size of defect $D_C$ of the defect pair;
$(x_i, y_i)$ are the coordinate locations of the $i^{th}$ pixel belonging to defect $D_C$;
$(x_C, y_C)$ is the centroid of the defect $D_C$.

Alternatively, the size $S_C$ of a defect $D_C$ is simply the number of pixels included in the defect. As another alternative, the size $S_C$ of a defect $D_C$ is the square root of the product of the number of pixels included in the defect times the inverse of $\pi$:

$$S_C = \sqrt{\frac{Q_C}{\pi}}$$

where:
$S_C$ is the size of defect $D_C$ of the defect pair;
$\pi$ is the mathematical constant and is approximately equal to 3.1415926; and
$Q_C$ is the number of pixels included in the defect $D_C$.

Another alternative is that the size $S_C$ is the largest circle centered at the defect's centroid that inscribes only defect pixels, that is, the circle does not include any pixels that are not associated with the defect within or on its border.

The size $S_C$ and distance $R_D$ are utilized in determining the age class. The size $S_C$ and distance $R_D$ can be used with a look up table (LUT) of predetermined values to provide an age class.

In a particular embodiment, the size $S_C$ and distance $R_D$ are features that are input to the age classifier 118. The age classifier 118 considers the input features 116 derived from analysis of redeye defects as well as other features 119 such as a wrinkle analysis, hair color analysis (gray hair increases likelihood of the subject being an older adult), and the like.

The age classifier 118 can be any classifier that considers features and outputs a classification. For example, the age classifier 118 can be a neural network, a maximum likelihood classifier, a k-nearest neighbor classifier, a learning vector quantizer, or any of a number of classifiers. The classifier 118 outputs an age class information 132 indicating the result of the age classification for the human subject associated with the redeye defects. The age class 132 can be a single age category (e.g. baby, child, adult, older adult) or it can be an age range in years. The age class 132 can also have an associated probability. For example, the age class 132 could indicate that a human subject has:
0% probability of being a baby
10% probability of being a child
60% probability of being an adult, and
30% probability of being an older adult.

Having a probability associated with each age category is useful because it allows a downstream application to choose its operation based on likelihood of error.

If the preferred embodiment, the feature 116 generated by the feature extractor 114 is a function of both the size S of the defect (i.e. the size of the dilated pupil) and distance $R_D$ between defects. Preferably, the feature is computed with the equation $$F = \text{int}\left(\frac{S-B}{R_D - B} K\right) + 1$$

where:
B is related to the pixels of blur in the image; and
K is a constant multiplier used to scale the data.
Preferably, B=2. Preferably, K=240$^{-1}$. The term "pixels of blur" refers to the size of the blur circle (i.e. point spread function) of the image capture device used to generate the digital image 102.

Figure 3:
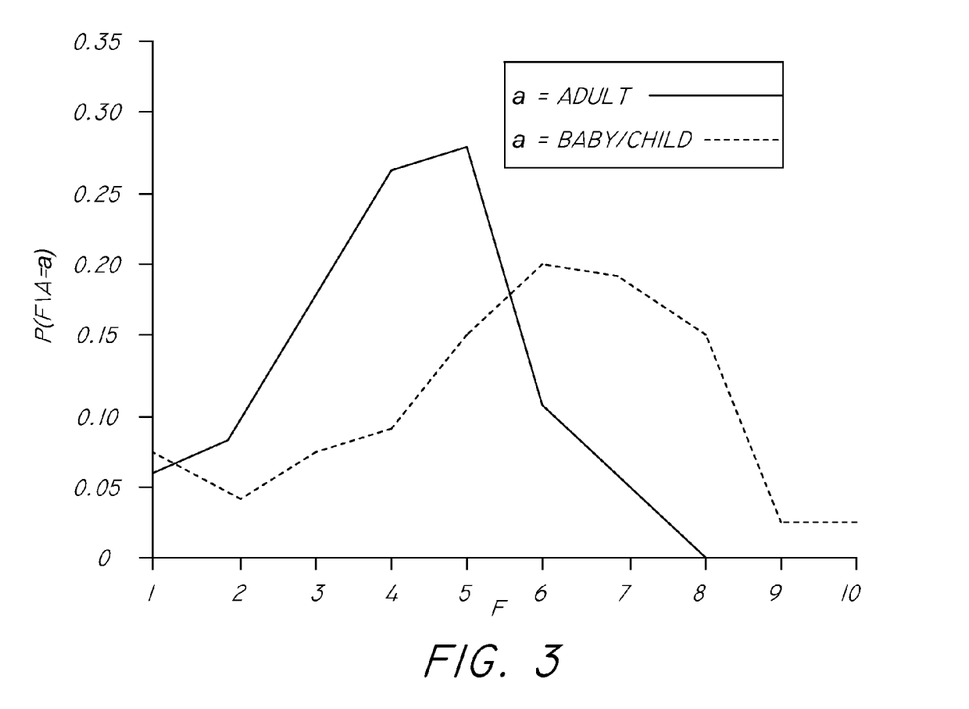
FIG. 3 shows a graph of the distributions of F for baby/child and for adult for images of 88 human faces having redeye defect.

FIG. 3 shows the distributions of F for baby/child and for adult for images of 88 human faces having redeye defect. (Discussed further below.) This plot shows P(F|A=baby/child) and P(F|A=adult), where A=a is the event that the human subject's true age category is a, where a is the age category (either baby/child or adult in this example). It can easily be seen that the distributions are different and therefore useful for determining the age of a human subject based on the feature related to the redeye defects.

In a particular embodiment, the age classifier 118 is a Bayesian classifier that calculates P(A=a|F), the probability of a human subject belonging to a certain age category given the feature values F. The age classifier 118 uses a learning stage, where many examples of known age are presented. The feature value is computed and the probability of the human subject belonging to a specific age category is determined by the Bayesian classifier 1118. According to Bayes theory, $$P(A = a | F) = \frac{P(F | A = a) P(A = a)}{P(F)}$$

Figure 4:
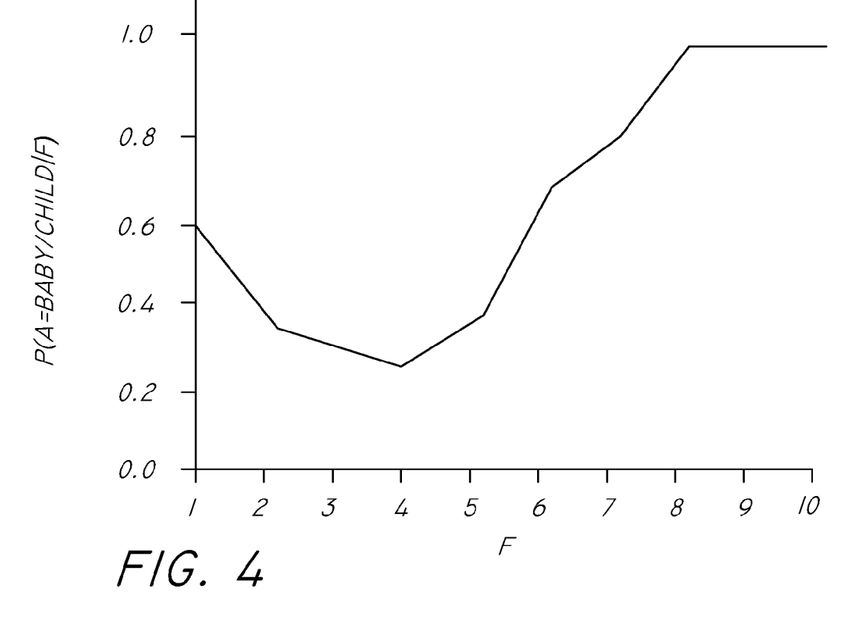
FIG. 4 is a graph of P(A=baby/child|F) vs. F for the images of FIG. 3.
Figure 5:
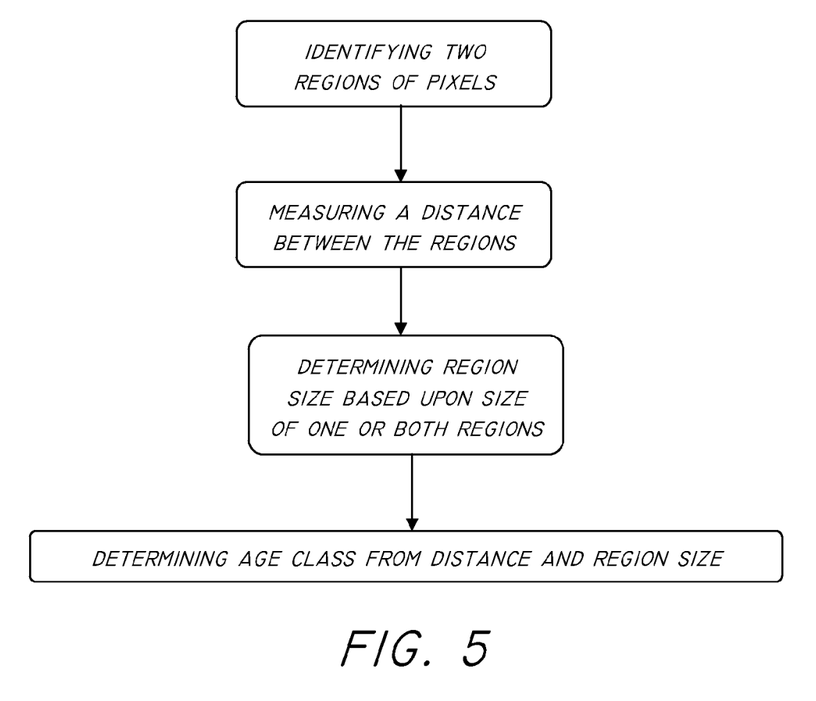
FIG. 5 is a flow chart of a method of the invention.
Figure 6:
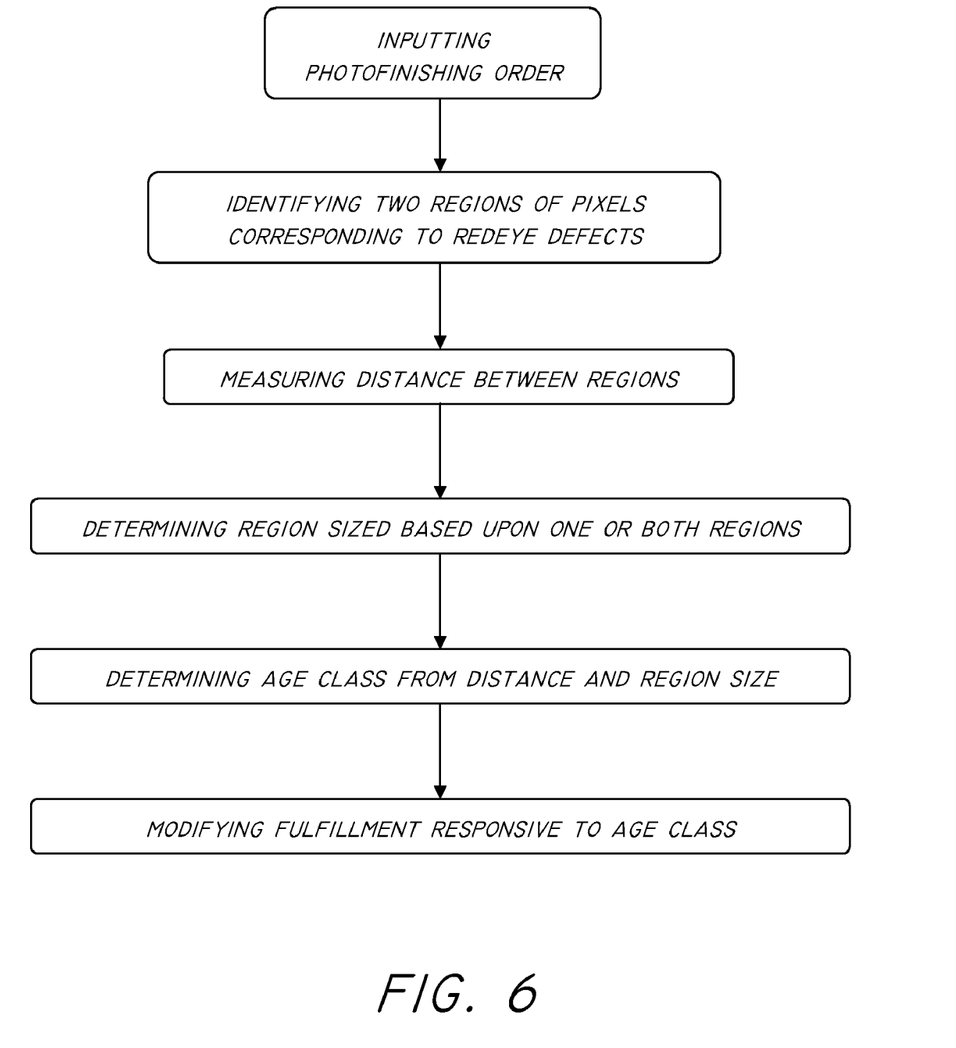
FIG. 6 is a flow chart of another method of the invention.

Assuming that the prior probability of adults and children is equal (P(A=adult)=P(A=baby/child)=0.5), the P(A=baby/child|F) is calculated and shown in FIG. 4 for the images of FIG. 3.

Preferably, the age classifier 118 operates in a mode that outputs the probability P(A=a|F); however, the age classifier 118 can also operate in a mode where it simply outputs the age category having the highest probability.

To demonstrate the utility of the invention, images of 88 human faces having redeye defect were analyzed. The ages of the human faces were manually classified into one of two categories: baby/child (ages up to approximately 9 years) and adult (older than 9 years). Out of the 88 human faces, 50 were children, and 38 were adults. For each face, a defect pair 112 was identified and the size S and distance $R_D$ was computed by analyzing each defect pair 112. Finally, the feature F was computed based on aforementioned equation. If classification into the age category of either baby/child or adult was required, then the classification was performed as follows: computing the value of P(A=a|F) for each age category and assigning the human subject to the age category a with the largest value of P(A=a|F). (This is the maximum apriori probability classifier.) Out of the 88 faces, 62 are correctly classified. This is greater than 70 percent. 8 adults were incorrectly classified and 18 babies/children were incorrectly classified. The expected error rate is calculated to be 28%, with an expected success rate of 72%. The probability of misclassification of a child is 35% while the probability of misclassifying an adult is 21%.

Alternatively, an even more effective feature F can be calculated, which takes into account out-of-plane rotation of the subject's head relative to the subject plane of the image captured by the camera. With head rotation, the measured distance $R_D$ will be equal to the actual distance when the subject is front-on to the camera (a line connecting the subject's eyes is parallel to the image plane) if the measured distance is divided by the cosine of the angle of rotation A. The angle of rotation A is the smallest angle between an imaginary line connecting the human subject's eyes and the image plane. This angle is essentially the angle related to rotation of the subject's head about a vertical axis passing from the top to the bottom of the head. (For example, when the subject is looking straight on to the camera, the angle A is 0. When the image is a profile of the left side of the face, the angle A is p/2 radians.)

This operation allows for the calculation of a distance between pupils that is invariant to the head rotation. K. Choi et al. describe a method by which the head pose (and angle A) can be derived through automatic analysis of an image. In the article "Estimating Facial Pose Using the EM Algorithm, Ninth British Machine Vision Conference, 1998. The article is available on the Internet at: http://www.bmva.ac.uk/bmvc/1998/pdf/p147.pdf. While head rotation affects the distance between a defect position pair $R_D$ it does not necessarily affect the size of the redeye defects in an image of the head because the eyes can rotate somewhat independently from the head and may still be looking directly at the camera.

An improved second size limit using the knowledge of the head rotation is calculated as:

$$F = \text{int}\left(\frac{\cos A(S-B)}{R_D - B}K\right) + 1$$

Where:
A is the angle of head rotation about a vertical axis passing from the top to the bottom of the head.

The preferred features are effective for use in classification of age of a human subject for several reasons. As previously stated, the size of the defect S relates to the size of the pupil. Therefore, an accurate measure of the dilated pupil size is useful for determining age. Generally, there is no way to measure absolute distances in images, so the distance between the eyes serves as a standard. This distance is also a good feature to use for age because the distance between the eyes for babies and children is much smaller than that of adults.

The age class 132 information is passed to an age sensitive application 140 that performs a task that is related to the age of a specific human. The age sensitive application can provide a binary response matching to a particular age class or using a particular age class as a threshold. The age sensitive application can also provide different responses for each of three or more age categories. The age sensitive application acts on the age class information to provide an output that is stored, presented to an operator, or automatically acted upon in modifying the digital image or in some other manner.

Age class information can be stored with a digital image as metadata for use at a later time. For example, stored metadata can be used to sort digital images by age class. Age class information can also be stored independent of the digital images. For example, a running count of museum visitors by age class can be collected.

Age class information can be output to an operator as an image and/or indicia display or can provide some other indication, such as a sound. In a particular example, the age classification method is performed real-time in a camera positioned in a darkened area to capture images of humans attempting to gain entry to an age specific event. For example, many establishments have age requirements (many times imposed by law). The digital images are captured in a darkened environment to maximize the pupil dilation, with a flash located near the camera lens to maximize the likelihood of the redeye defect in the image. The camera can directly provide an indication of compliance or non-compliance with the age class threshold or can provide a signal to a separate monitor or other output device.

Age class information can be used to automatically provide a particular result based upon age classification. For example, age classification can be automatically applied in photofinishing to modify fulfillment. It is common for a photofinisher to insert an advertisement with a completed printed set of photos in order to present the advertisement to a consumer. The advertisement may not be relevant to the consumer and thus be ignored. If the age classification of the present invention is performed on a consumer's order, then an advertisement for an age-specific product or service can be presented that is more likely to be relevant to the consumer. This increases the effectiveness of the money spent on advertising. For example, if the age classifier determines that a baby is present in a certain percentage of the consumer's print order, then an advertisement for a specific brand of diaper may be packaged with the consumer's completed print order. Likewise, if the age classifier determines that an older adult is present in a certain percentage of the consumer's print order, then an advertisement for a retirement financial planning may be included with the print order. In another example, digital algorithms are often applied in the photofinishing process when producing photographic prints (from images from digital cameras or film). These digital algorithms can allow for the production of prints having a large quality improvement over traditional optical processing or a competitor's processing method. Unfortunately, it is difficult to show the consumer the quality improvement, because that would require the expensive step of printing the consumer's images with the digital algorithms and a reference method (e.g. optical printing). Therefore, it is often desired to select a small subset of the print order (say 1 or 2 prints) having image content that the consumer has a strong emotional (e.g. babies) with, to demonstrate the effectiveness of the digital algorithms. The method described herein can be used to detect babies in images, thereby providing images that the consumer will have interest in to demonstrate digital algorithms for the purpose of advertising. For example, an algorithm to remove redeye can be applied to the image.

The invention has been described in detail with particular reference to certain preferred embodiments thereof, but it will be understood that variations and modifications can be effected within the spirit and scope of the invention.

The invention claimed is:

1. A method for ascertaining the age class of a human subject in a digital image, the human subject having a redeye defect pair, each defect of the redeye defect pair having one or more redeye defect pixels, the method comprising using a processor to perform the steps of:
    identifying two regions of redeye defect pixels corresponding to the redeye defect pair;
    measuring a distance between said regions;
    determining a region size based upon a size of at least one of said regions;
    determining a normalized region size by forming a ratio involving said region size and said distance; and
    determining an age class responsive to the normalized region size.

2. The method of claim 1 wherein said distance is calculated from corresponding points in each of said regions.

3. The method of claim 1 wherein said measuring of said distance further comprises determining a centroid of each said region and determining a separation of said centroids.

4. The method of claim 1 wherein said measuring of said distance further comprises measuring a separation of said eyes, determining an out-of-plane rotation of the head of the human subject relative to a subject plane defined by said digital image, and correcting said separation for said rotation.

5. The method of claim 1 wherein said region size is a count of the number of redeye defect pixels in one or both of the redeye defects.

6. The method of claim 1 wherein said determining said region size further comprises measuring a size of each of said regions and determining an average of said sizes of each of said regions.

7. The method of claim 6 wherein the size of each of said regions is the square root of the product of a count of the number of redeye defect pixels in a respective redeye defect times the inverse of the mathematical constant π.

8. The method of claim 6 wherein the size of each of said regions is the radius of the smallest circle that inscribes the respective redeye defect.

9. The method of claim 6 wherein said measuring of said distance further comprises determining a centroid of each of said regions; and the size of each of said regions is the radius of the smallest circle that inscribes the respective redeye defect.

10. The method of claim 6 wherein said measuring of said distance further comprises determining a centroid of each of said regions; and the size $S_C$ of each of said regions is given by:

$$S_C = \max_i \left[ \sqrt{(x_i - x_C)^2 + (y_i - y_C)^2} \right]$$

wherein:
$(x_i, y_i)$ are the coordinate locations of the $i^{th}$ redeye defect pixel of the respective redeye defect; and
$(x_C, y_C)$ is the centroid of the respective defect.

11. The method of claim 6 wherein said measuring of said distance further comprises determining a centroid of each of said regions; and the size of each of said regions is the largest circle centered at the centroid of the respective redeye defect that inscribes only redeye defect pixels.

12. The method of claim 1 further comprising inducing pupil dilation in the human subject; capturing the digital image with a camera during said pupil dilation.

13. The method of claim 1 wherein said camera defines an optical axis and said method further comprises illuminating said human subject, during said capturing, with a light source positioned close to said optical axis of said camera.

14. The method of claim 1 wherein determining said age class further comprises accessing a look-up table value corresponding to said distance and said region size.

15. The method of claim 1 wherein said determining said age class further comprises computing said age class with an age classifier.

16. The method of claim 15 wherein said computing utilizes said size, said distance, and one or more additional features.

17. The method of claim 16 wherein said additional features include at least one of: wrinkle analysis and hair color analysis.

18. The method of claim 15 wherein said determining said age class further comprises selecting said age class and assigning a probability.

19. The method of claim 18 wherein said age range is selected from the categories: baby, child, adult, and older adult.

20. The method of claim 15 wherein said age classifier is a Bayesian classifier.

21. A method for ascertaining the age class of a human subject in a digital image, the human subject having a redeye defect pair, each redeye defect of the redeye defect pair having one or more redeye defect pixels, the method comprising using a processor to perform the steps of:
identifying two regions of redeye defect pixels corresponding to the redeye defect pair;
measuring a distance between said regions;
determining a region size based upon a size of at least one of said regions; and
determining an age class from said distance and said region size;
wherein said determining said age class further comprises computing said age class with an age classifier; and
wherein said determining of said region size further comprises computing a redeye feature F and using said redeye feature F in said age classifier, said redeye feature F being given by:

$$F = \text{int}\left(\frac{S-B}{R_D - B}K\right) + 1$$

wherein:
S is said region size;
B is a function of pixels of blur in the image;
K is a constant multiplier; and
$R_D$ is said distance.

22. The method of claim 21 wherein $R_D$ is in units of pixels and is given by:

$$R_D = \sqrt{(x_1 - x_2)^2 + (y_1 - y_2)^2}$$

wherein $(x_1, y_1)$ and $(x_2, y_2)$ are the coordinate locations of corresponding said redeye defect pixels of each redeye defect of the redeye defect pair.

23. The method of claim 21 wherein said determining further comprises measuring a size of each of said regions and determining an average of said sizes of each of said regions.

24. A method for ascertaining the age class of a human subject in a digital image, the human subject having a redeye defect pair, each redeye defect of the redeye defect pair having one or more redeye defect pixels, the method comprising using a processor to perform the steps of:
identifying two regions of redeye defect pixels corresponding to the redeye defect pair;
measuring a distance between said regions;
determining a region size based upon a size of at least one of said regions; and
determining an age class from said distance and said region size;
wherein said determining said age class further comprises computing said age class with an age classifier; and
wherein said measuring of said distance further comprises determining an angle of out-of-plane rotation of the head of the human subject relative to a subject plane defined by said digital image; and said determining of said region size further comprises computing a redeye feature F and using said redeye feature F in said age classifier, said redeye feature F being given by:

$$F = \operatorname{int}\left(\frac{\cos A(S-B)}{R_D - B} K\right) + 1$$

wherein:
B is a function of pixels of blur in the image;
K is a constant multiplier;
A is said angle of out-of-plane rotation;
S is said region size; and
$R_D$ is said distance.

25. The method of claim 24 wherein B=2 and K=240$^{-1}$.

26. The method of claim 24 wherein $R_D$ is in units of pixels and is given by:

$$R_D = \sqrt{(x_1-x_2)^2 + (y_1-y_2)^2}$$

wherein $(x_1, y_1)$ and $(x_2, y_2)$ are the coordinate locations of corresponding said redeye defect pixels of each redeye defect of the redeye defect pair.

27. The method of claim 24 wherein said determining further comprises measuring a size of each of said regions and determining an average of said sizes of each of said regions.

28. A system for ascertaining the age class of a human subject in a digital image, the human subject having a redeye defect pair, each redeye defect of the redeye defect pair having one or more redeye defect pixels, the apparatus comprising:
means for identifying two regions of redeye defect pixels corresponding to the redeye defect pair;
means for measuring a distance between said regions;
means for determining a region size based upon a size of at least one of said regions;
means for determining a normalized region size by forming a ratio involving said region size and said distance; and
means for determining an age class responsive to the normalized region size.

29. A non-transitory computer readable storage medium having a computer program stored thereon for ascertaining the age class of a human subject in a digital image, the human subject having a redeye defect pair and each redeye defect of the redeye defect pair having one or more redeye defect pixels, wherein said computer program:
identifies two regions of redeye defect pixels corresponding to the redeye defect pair;
measures a distance between said regions;
determines a region size based upon a size of at least one of said regions; and
determines a normalized region size by forming a ratio involving said region size and said distance; and
determines an age class responsive to the normalized region size.

30. A photofinishing method comprising:
inputting a photofinishing order having one or more digital images;
ascertaining an age class of a human subject in at least one of said digital images, the human subject having a redeye defect pair, each redeye defect of the redeye defect pair having one or more redeye defect pixels, said ascertaining including using a processor to perform the steps of:
identifying two regions of redeye defect pixels corresponding to the redeye defect pair,
measuring a distance between said regions,
determining a region size based upon a size of at least one of said regions,
determining a normalized region size by forming a ratio involving said region size and said distance;
determining an age class responsive to the normalized region size; and
modifying fulfillment of said photofinishing order responsive to said ascertained age class.

31. The method of claim 30 wherein said modifying further comprises selecting one of a plurality of advertisements responsive to said ascertaining, and providing said advertisement in said fulfillment.

32. A system for ascertaining the age class of a human subject in a digital image, the human subject having a redeye defect pair, each redeye defect of the redeye defect pair having one or more redeye defect pixels, the apparatus comprising the following components:
a redeye defect detector that identifies two regions of redeye defect pixels corresponding to the redeye defect pair;
a feature extractor that measures a distance between said regions identified by the redeye defect detector and determines a region size based upon a size of at least one of said regions; and
an age classifier that determines an age class from said distance and said region size measured and determined by said feature extractor;
wherein said feature extractor computes a redeye feature F and the age classifier uses said redeye feature F to determine said age class, wherein said redeye feature F being given by:

$$F = \operatorname{int}\left(\frac{S-B}{R_D - B} K\right) + 1$$

wherein:
S is said region size;
B is a function of pixels of blur in the image;
K is a constant multiplier; and
$R_D$ is said distance
wherein one or more of the components are implemented using a data processor.

33. A system as claimed in claim 32, wherein $R_D$ is in units of pixels and is given by:

$$R_D = \sqrt{(x_1-x_2)^2 + (y_1-y_2)^2}$$

wherein $(x_1, y_1)$ and $(x_2, y_2)$ are the coordinate locations of corresponding said redeye defect pixels of each redeye defect of the redeye defect pair.

34. A system as claimed in claim 32 wherein said feature extractor measures a size of each of said regions and determines an average of said sizes of each of said regions.

35. A system for ascertaining the age class of a human subject in a digital image, the human subject having a redeye defect pair, each redeye defect of the redeye defect pair having one or more redeye defect pixels, the apparatus comprising the following components:
a redeye defect detector that identifies two regions of redeye defect pixels corresponding to the redeye defect pair;
a feature extractor that measures a distance between said regions identified by the redeye defect detector and determines a region size based upon a size of at least one of said regions; and an age classifier that determines an age class from said distance and said region size measured and determined by said feature extractor;

wherein said feature extractor determines an angle of out-of-plane rotation of the head of the human subject relative to a subject plane defined by said digital image, and computes a redeye feature F that is used by said age classifier to determine said age class, wherein said redeye feature F is given by:

$$F = \text{int}\left(\frac{\cos A(S-B)}{R_D - B}K\right) + 1$$

wherein:
B is a function of pixels of blur in the image;
K is a constant multiplier;
A is said angle of out-of-plane rotation;
S is said region size; and
$R_D$ is said distance
wherein one or more of the components are implemented using a data processor.

36. A system for ascertaining the age class of a human in a digital image as claimed in claim 35, wherein B=2 and K=$240^{-1}$.

37. A system for ascertaining the age class of a human in a digital image as claimed in claim 35, wherein $R_D$ is in units of pixels and is given by:

$$R_D = \sqrt{(x_1-x_2)^2 + (y_1-y_2)^2}$$

wherein $(x_1, y_1)$ and $(x_2, y_2)$ are the coordinate locations of corresponding said pixels of each redeye defect of the redeye defect pair.

38. A system for ascertaining the age class of a human in a digital image as claimed in claim 35, wherein said feature extractor determines a region size measures a size of each of said regions and determines an average of said sizes of each of said regions.

39. A system for ascertaining the age class of a human subject in a digital image, the human subject having a redeye defect pair, each redeye defect of the redeye defect pair having one or more redeye defect pixels, the apparatus comprising the following components:

a redeye defect detector that identifies two regions of redeye defect pixels corresponding to the redeye defect pair;

a feature extractor that measures a distance between said regions identified by the redeye defect detector and determines a region size based upon a size of at least one of said regions;

a normalizer that determines a normalized region size by forming a ratio involving said region size and said distance;

an age classifier that determines an age class responsive to said normalized region size determined by said normalizer; and wherein one or more of the components are implemented using a data processor.

* * * * *